No. 692,010. Patented Jan. 28, 1902.
H. GOTTSCHALK.
KID GLOVE CLEANER AND PROCESS OF MAKING SAME.
(Application filed Oct. 3, 1901.)

(No Model.)

WITNESSES:

INVENTOR

BY
ATTORNEYS

UNITED STATES PATENT OFFICE.

HERMAN GOTTSCHALK, OF CHICAGO, ILLINOIS.

KID-GLOVE CLEANER AND PROCESS OF MAKING SAME.

SPECIFICATION forming part of Letters Patent No. 692,010, dated January 28, 1902.

Application filed October 3, 1901. Serial No. 77,422. (No specimens.)

*To all whom it may concern:*

Be it known that I, HERMAN GOTTSCHALK, a citizen of the United States, residing at Chicago, in the county of Cook and State of Illinois, have invented a new and Improved Kid-Glove Cleaner and Process of Making the Same, of which the following is a specification.

The subject of my invention is a cleaner for kid gloves, consisting of a body of sponge-rubber impregnated with benzin and a back of solid rubber, and the invention further relates to an improved process by which the said glove-cleaner is produced.

Figure 1:
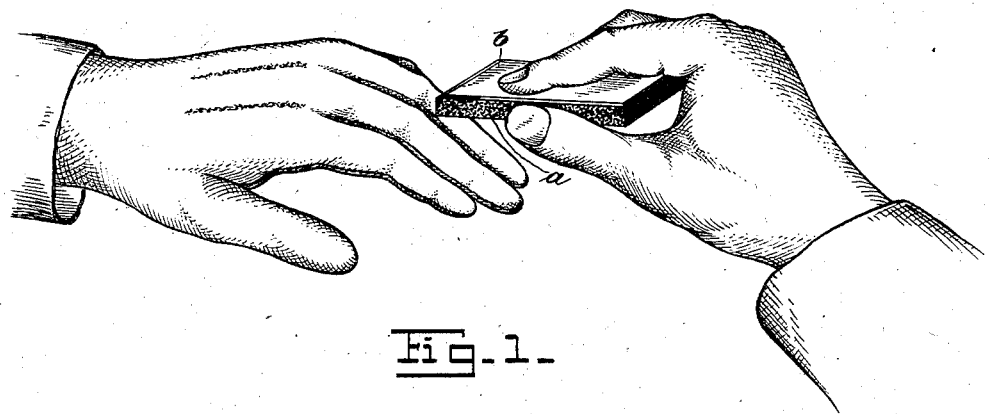
Figure 2:
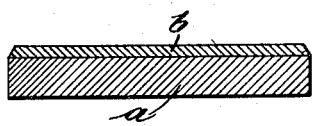

In the accompanying drawings, Figure 1 is a perspective view of a glove-cleaner, illustrating my invention. Fig. 2 is a longitudinal section of the same.

In carrying out my invention I take pure rubber and reduce it to a plastic state by means of a masticator and the admixture of fifteen to twenty per cent. of its weight of flowers of sulfur or any of the sulfur compounds usually employed to prepare it for vulcanization and add thereto bakers' yeast, such as employed in making bread and in about the same proportion. The plastic mass is then kneaded after the manner of bread to thoroughly incorporate the yeast throughout the mass, after which it is boiled in water for two hours, more or less, until the mass becomes thoroughly aerated. The carbonic-acid gas generated in the fermentation of the yeast produces numerous small interstices or pores, and the gas being confined in the plastic rubber is expanded by the heat in the boiling operation, so as to increase the effect in producing a spongy condition throughout the mass. While in a plastic state the mass is rolled in sheets of about a quarter of an inch or any convenient thickness, after which it is vulcanized by heat to a sufficient degree to impart to it the permanent elastic condition usual in sponge-rubber. After this the sheets are soaked in benzin for thirty minutes, more or less, until the benzin has completely permeated the porous mass and has become partially incorporated with the rubber. A backing of solid rubber of one-sixteenth of an inch in thickness, more or less, is then permanently secured to one face of the sheet by means of rubber cement, after which the sheets are cut up in convenient size and shape for use.

The drawings show a glove-cleaning pad thus prepared, $a$ representing the sponge rubber body or face, and $b$ the solid-rubber back.

In use the pad is conveniently held edgewise between the thumb and last three fingers, while the forefinger bears against the back $b$. The glove to be cleaned being placed on one hand, the face of the elastic cleaning-pad is applied with perfect facility to every part of the surface of the glove requiring cleaning, and by means of the benzin incorporated in the rubber, aided by the friction of the rubber sponge, all stains are quickly removed.

In practice I make cleaners for black gloves of black rubber and those for white or colored gloves of light-colored rubber.

After the cleaners have become soiled in use they can be readily and completely cleansed by washing in simple soap and water.

Having thus described my invention, the following is what I claim as new therein and desire to secure by Letters Patent:

1. The process herein described for producing a cleaner for kid gloves, which consists in kneading plastic-rubber composition together with yeast which is thus diffused through the mass, boiling in water to effect aeration, rolling in sheets, vulcanizing in the condition of rubber sponge, and soaking in benzin until the mass is thoroughly impregnated therewith.

2. The kid-glove cleaner herein described, consisting of a body $a$, of a rubber sponge impregnated with benzin or the like, and a backing $b$ of solid rubber.

HERMAN GOTTSCHALK.

Witnesses:
J. GREEN,
OCTAVIUS KNIGHT.